US011252938B2

(12) United States Patent
Dagnoli

(10) Patent No.: US 11,252,938 B2
(45) Date of Patent: Feb. 22, 2022

(54) PET CREATE SPACE ANIMAL REPELLING SYSTEM AND METHOD

(71) Applicant: Lisa Dagnoli, East Longmeadow, MA (US)

(72) Inventor: Lisa Dagnoli, East Longmeadow, MA (US)

( * ) Notice: Subject to any disclaimer, the term of this patent is extended or adjusted under 35 U.S.C. 154(b) by 286 days.

(21) Appl. No.: 16/555,712

(22) Filed: Aug. 29, 2019

(65) Prior Publication Data
US 2021/0059214 A1 Mar. 4, 2021

(51) Int. Cl.
*A01K 15/02* (2006.01)
*A01K 27/00* (2006.01)

(52) U.S. Cl.
CPC .......... *A01K 15/029* (2013.01); *A01K 27/001* (2013.01)

(58) Field of Classification Search
CPC .... A01K 15/029; A01K 27/001; A01K 15/02; A01K 15/021; A01K 15/022; A01K 15/023; A01K 27/002; A01K 27/009
See application file for complete search history.

(56) References Cited

U.S. PATENT DOCUMENTS

| | | | | |
|---|---|---|---|---|
| 7,705,736 B1 * | 4/2010 | Kedziora | ............. | A01K 29/005 340/573.3 |
| 9,743,643 B1 * | 8/2017 | Kaplan | ................ | A01K 27/009 |
| 2006/0011144 A1 * | 1/2006 | Kates | ..................... | A01K 15/02 119/719 |
| 2006/0011146 A1 * | 1/2006 | Kates | .................. | A01K 15/021 119/719 |
| 2014/0299062 A1 * | 10/2014 | Yin | ....................... | A01K 15/021 119/51.02 |
| 2014/0352632 A1 * | 12/2014 | McLaughlin | .......... | A01K 11/00 119/721 |
| 2015/0373951 A1 * | 12/2015 | Kelly | .................. | A01K 27/009 119/719 |
| 2016/0295833 A1 * | 10/2016 | Baize | ................... | A01K 15/023 |
| 2017/0083018 A1 * | 3/2017 | Womble | .................. | E01H 1/006 |
| 2017/0251633 A1 * | 9/2017 | Womble | .............. | A01K 15/025 |
| 2018/0310526 A1 * | 11/2018 | Birch | ................... | A01K 11/006 |
| 2020/0178495 A1 * | 6/2020 | Womble | ............... | A01K 5/0114 |

\* cited by examiner

*Primary Examiner* — Trinh T Nguyen
(74) *Attorney, Agent, or Firm* — Lyman Moulton, Esq.; Moulton Patents, PLLC

(57) ABSTRACT

A system and method for animal aversion training, includes a module for outfitting at least two animals each with an EM (electromagnetic) transceiver, processor and power source, a module for processing a proximity distance between the at least two animals via the EM transceiver, processor and power source, a module for identifying a relationship quality of the at least two animals via an unfriendly threshold and a number of points tallied from past encounters and a module for delivering a pulse shock to the at least two animals of intensity based on the relationship quality and the proximity distance between them. The system and method also include a sensor for a first animal for detecting a proximity distance of a second animal not having an EM transceiver, wherein the sensor replaces a function of the EM transceiver for the second animal. A cell phone application facilitates the disclosure limitations.

18 Claims, 6 Drawing Sheets

PET CREATE SPACE ANIMAL REPELLING SYSTEM AND METHOD

BACKGROUND AND FIELD OF INVENTION

Shock collars, also known as e-collars, remote training collars, electric collars, zap collars, or hunting collars, are electronic training aids developed to deliver a low intensity electrical signal, vibration, tone, or light signal to the dog via the collar. Shock collars are used primarily as a means of remote communication and widely accepted as a primary tool for the training of deaf and working dogs. The "aversive" use of these collars is seen mainly in the field of containment where they have been seen as one of the most effective and least invasive of all the aversive tools since the 1980s. Attaching a leash or lead to an electronic collar can pull the contacts too close to the dog's skin, causing lessened effectiveness of the collar and discomfort.

Some shock collars consist of a radio receiver attached to the collar and a transmitter that the trainer holds. When triggered, the collar delivers an aversive. The specific aversives vary with different makes of collars. Some emit sounds, some vibrate, some release citronella or other aerosol sprays, some apply electrical stimulation. A few collars incorporate several of these. Of these, electrical stimulation is the most common and the most widely used. Early, electrical collars provided only a single, high-level shock and were useful only to punish undesirable behavior.

Modern electrical collars are adjustable, allowing the trainer to match the stimulation level to the dog's sensitivity and temperament. They deliver a measured level of aversive stimulation that produces from a mildly irritating tingle or tap sensation to severe discomfort or pain. Used at high levels collars startle without risk of producing permanent physical injury when used correctly. Shock collars are prohibited or restricted in some places.

SUMMARY OF THE INVENTION

A system and method for animal aversion training, includes a module for outfitting at least two animals each with an EM (electromagnetic) transceiver, processor and power source, a module for processing a proximity distance between the at least two animals via the EM transceiver, processor and power source, a module for identifying a relationship quality of the at least two animals via an unfriendly threshold and a number of points tallied from past encounters and a module for delivering a pulse shock to the at least two animals of intensity based on the relationship quality and the proximity distance between them. The system and method also include a sensor for a first animal for detecting a proximity distance of a second animal not having an EM transceiver, wherein the sensor replaces a function of the EM transceiver for the second animal. A cell phone application facilitates the disclosure limitations.

Other aspects and advantages of embodiments of the disclosure will become apparent from the following detailed description, taken in conjunction with the accompanying drawings, illustrated by way of example of the principles of the disclosure.

BRIEF DESCRIPTION OF THE DRAWINGS

Throughout the description, similar and same reference numbers may be used to identify similar and same elements depicted in multiple embodiments.

Figure 1:
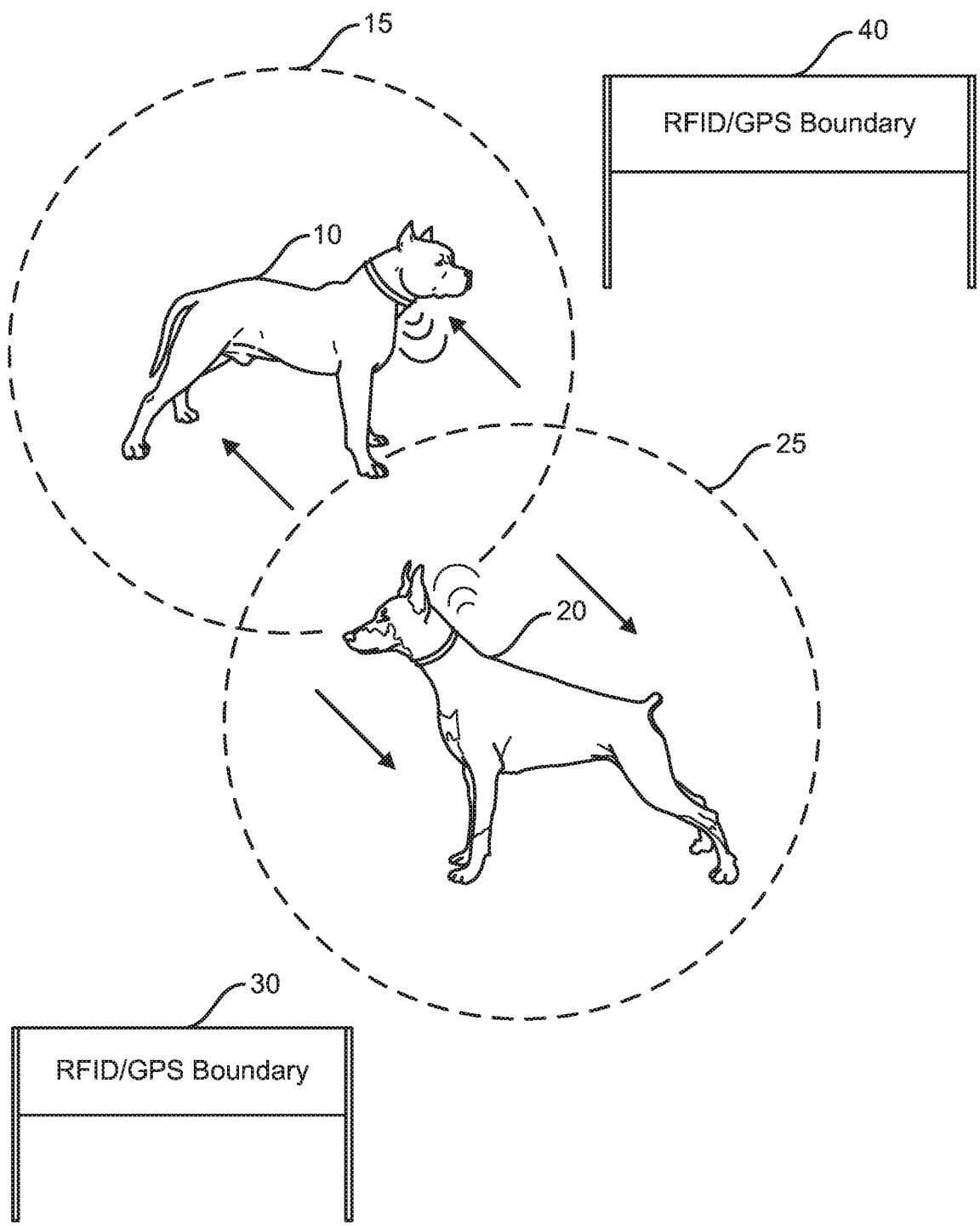
FIG. 1 is a pictorial of a method for pet create space animal repelling in accordance with an embodiment of the present disclosure.

Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

The term 'null' used in the present disclosure refers to a non-event and therefore no pulse shock is delivered.

FIG. 1 is a pictorial of a method for pet create space animal repelling in accordance with an embodiment of the present disclosure. The depiction includes a first animal and the second animal of the at least two animals having a collar engineered with the disclosed hardware 10 and 20 for the pet create animal repelling method and system. The first proximity distance is indicated by a broken line circle 15 and the second proximity distance is indicated by a broken line circle 25. The RFID/GPS boundaries 30 and 40 are indicative of a transition from Radio Frequency Identification and Global Positioning System Identification. The aversion training coming from the shock collars is indicated by opposing arrows near each of the at least two animals. The waves adjacent an animals shock collar are indicative of an aversion shock of electricity, vibration, sound and smell and a combination thereof.

Figure 2:
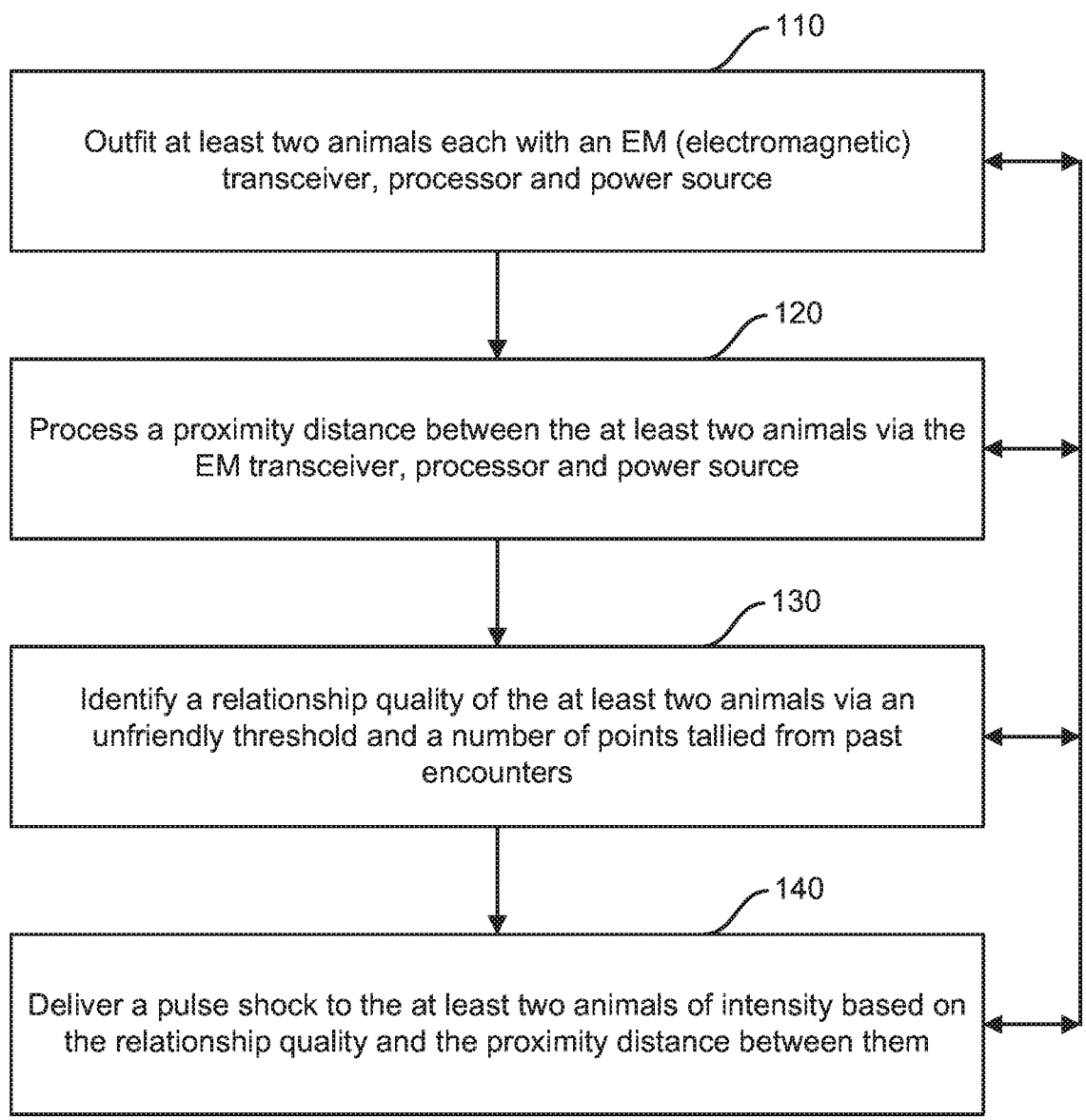
FIG. 2 is a flow chart of a method for pet create space animal repelling in accordance with an embodiment of the present disclosure.

FIG. 2 is a flow chart of a method for pet create space animal repelling in accordance with an embodiment of the present disclosure. The method includes initializing or outfitting 110 at least two animals each with an EM (electromagnetic) transceiver, processor and power source. The method also includes processing 120 a proximity distance between the at least two animals via the EM transceiver, processor and power source. The method additionally includes identifying 130 a relationship quality of the at least two animals via an unfriendly threshold and a number of points tallied from past encounters. The method further includes delivering 140 a pulse shock to the at least two animals of intensity based on the relationship quality and the proximity distance between them.

Figure 3:
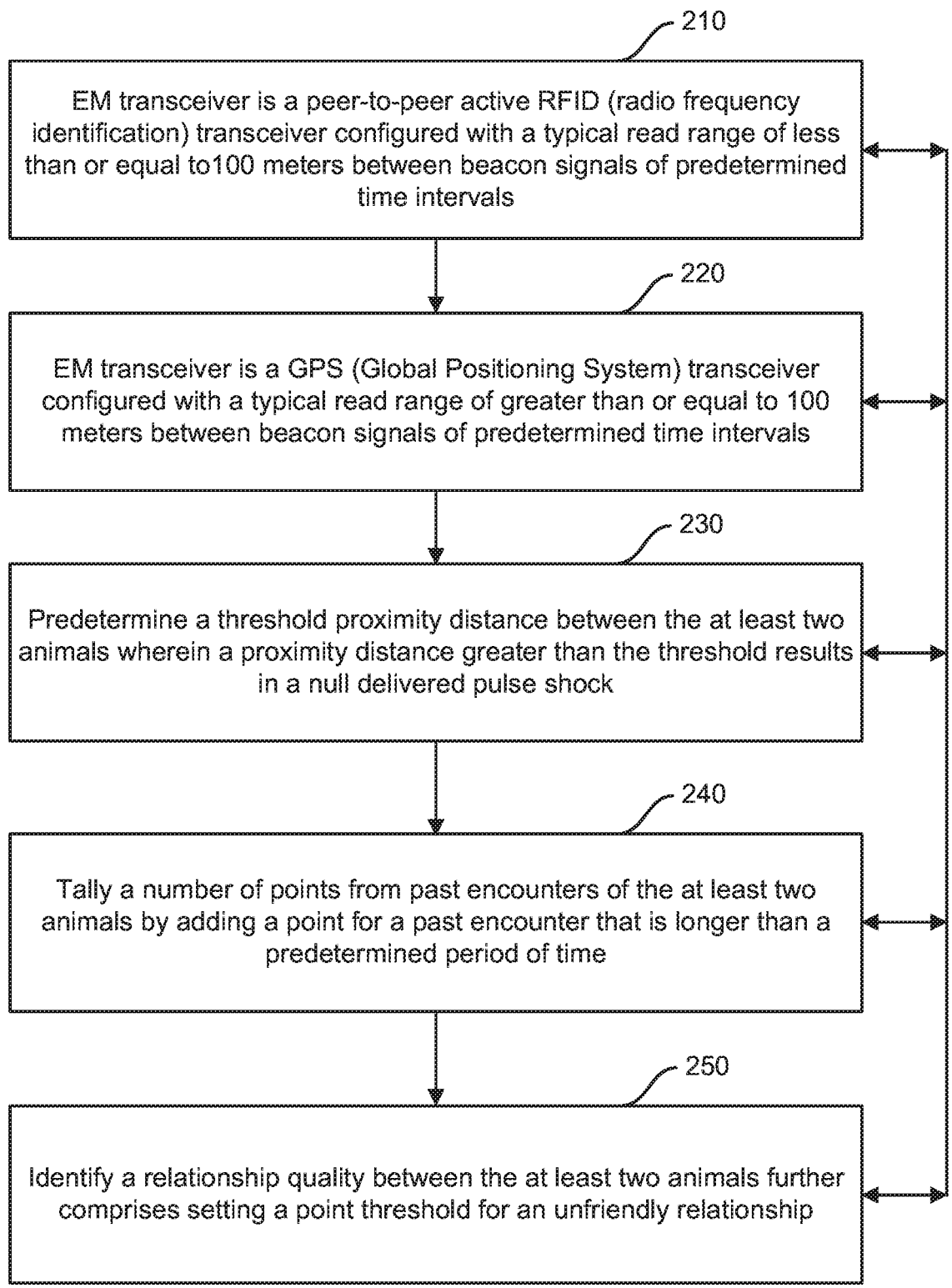
FIG. 3 is a flow chart of method embodiments for pet create space animal repelling in accordance with an embodiment of the present disclosure.

FIG. 3 is a flow chart of method embodiments for pet create space animal repelling in accordance with an embodiment of the present disclosure. The method embodiments include an EM transceiver in a peer to peer active RFID 210 configured with a typical read range of less than or equal to 100 meters between beacon signals of predetermined time intervals. EM transceiver is a GPS 220 transceiver configured with a typical read range of less than or equal to 100 meters between beacon signals of predetermined time intervals. The flow chart includes predetermining 230 a threshold proximity distance between the at least two animals wherein a proximity distance greater than the threshold results in a null delivered pulse shock. The flow chart also includes tallying 240 a number of points from past encounters of the at least two animals by adding a point for a past encounter that is longer than a predetermined period of time. The flow chart further includes identifying 250 a relationship quality between the at least two animals including setting a point threshold for an unfriendly relationship.

Figure 4:
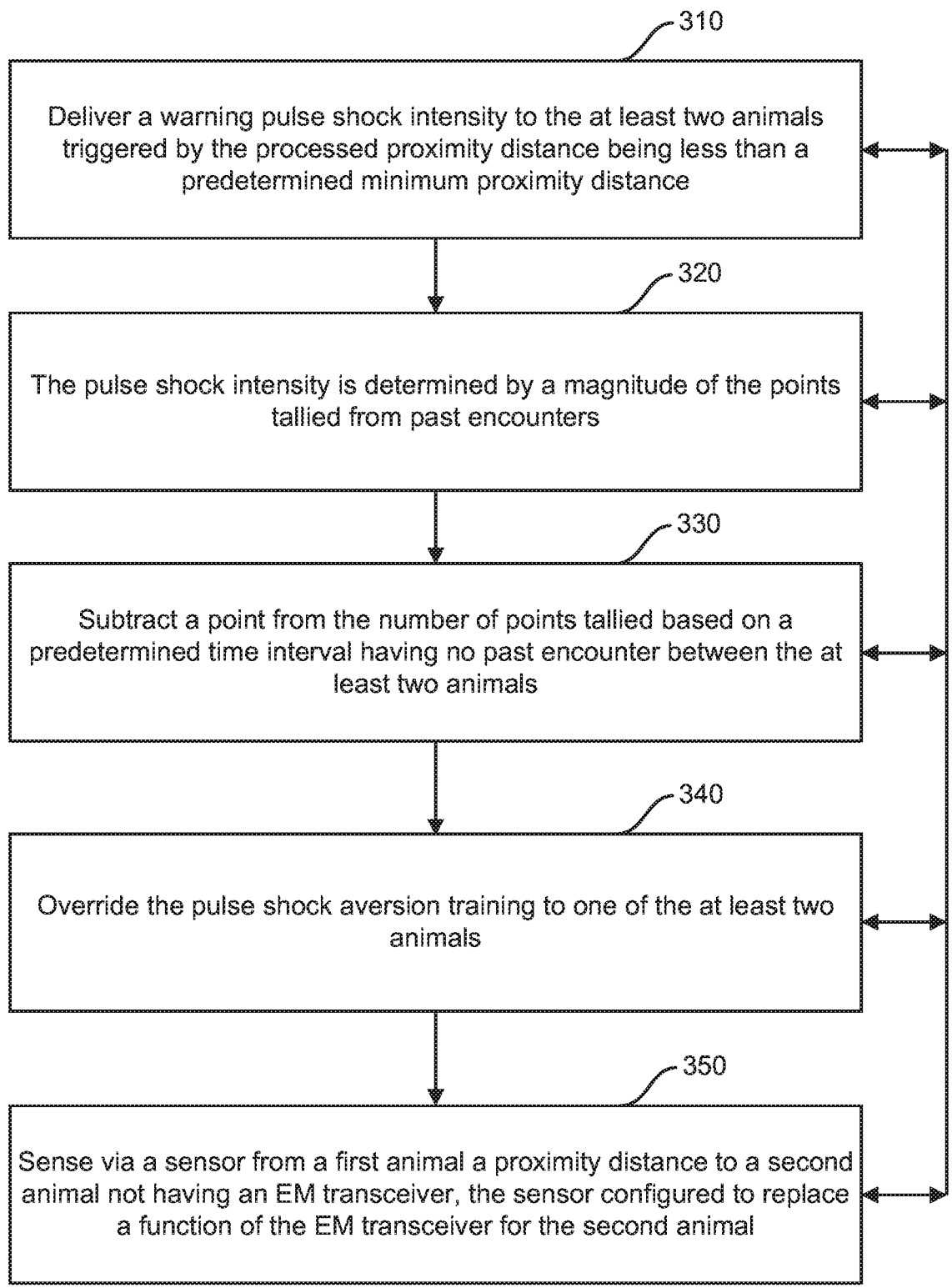
FIG. 4 is a flow chart of additional method embodiments for pet create space animal repelling in accordance with an embodiment of the present disclosure.

FIG. 4 is a flow chart of additional method embodiments for pet create space animal repelling in accordance with an embodiment of the present disclosure. The additional method embodiments depicted include delivering 310 a warning pulse shock intensity to the at least two animals triggered by the processed proximity distance being less than a predetermined proximity distance. The embodied methods depicted also include pulse shocking 320 the at least two animals with an intensity determined by a magnitude of the points tallied from past encounters between the animals. The disclosure includes subtracting 330 a point from the number of points tallied based on a predetermined time interval having no past encounters between the at least two animals. The disclosure additionally includes overriding 340 the pulse shock aversion training to one of the at least two animals. The disclosure yet includes sensing 350 via a sensor including heat sensing, a proximity distance from a first animal to a second animal not having an EM transceiver, the sensor configured to replace a function of the EM transceiver for the second animal.

Figure 5:
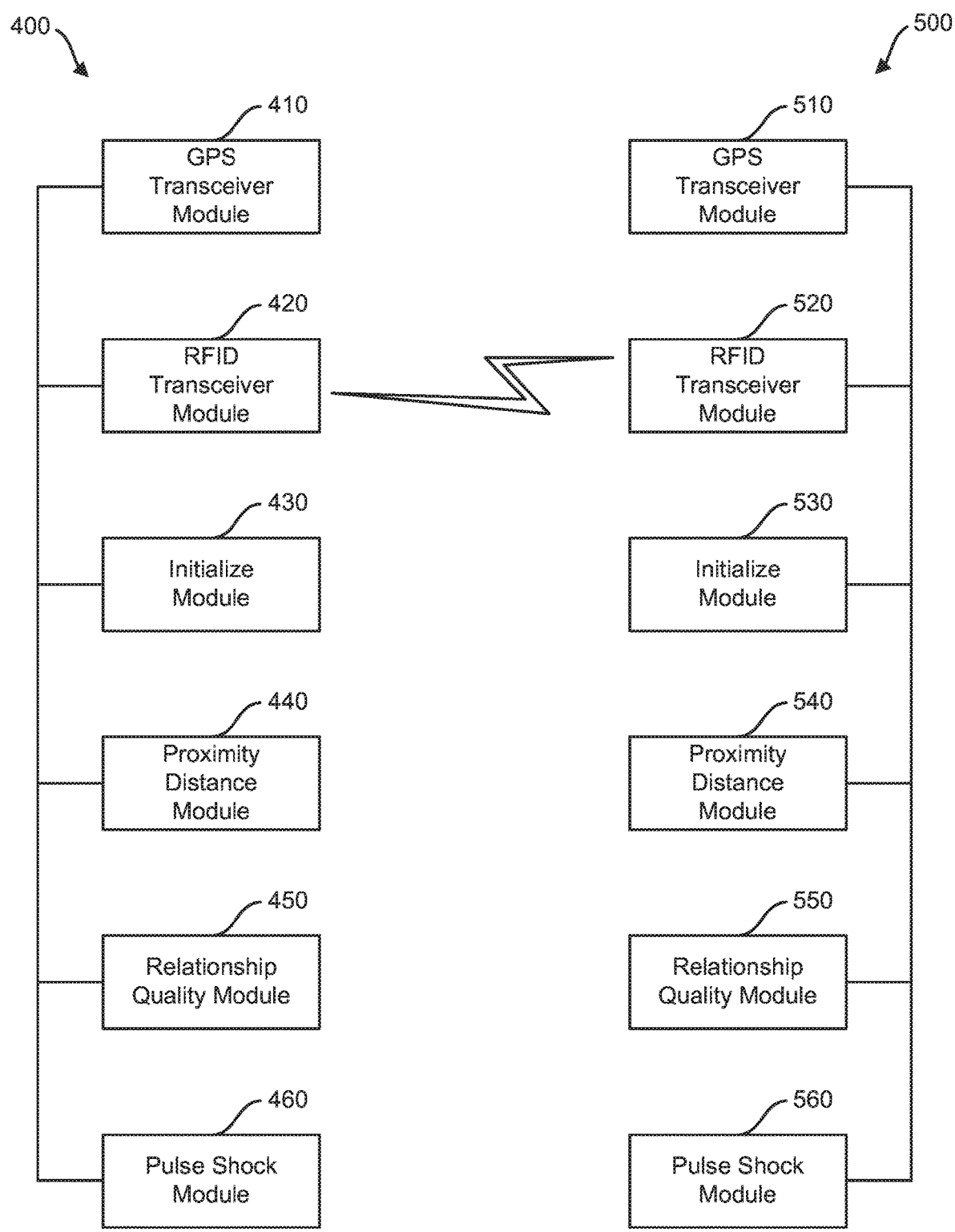
FIG. 5 is a block diagram of the modules for at least two animals for pet create animal repelling in accordance with an embodiment of the present disclosure.

FIG. 5 is a block diagram of the modules for at least two animals for pet create animal repelling in accordance with an embodiment of the present disclosure. The depiction includes a first animal modules including a GPS transceiver module 410, a RFID transceiver module 420, an initialization of hardware module 430, a proximity distance module 440, a relationship quality module 450 and a pulse shock module 460. The block diagram also depicts a second animal modules including a GPS transceiver module 510, a RFID transceiver module 520, an initialization of hardware module 530, a proximity distance module 540, a relationship quality module 550 and a pulse shock module 560. An electromagnetic wave is depicted between the RFID module 420 and the RFID module 520 indicating a peer to peer communication.

Figure 6:
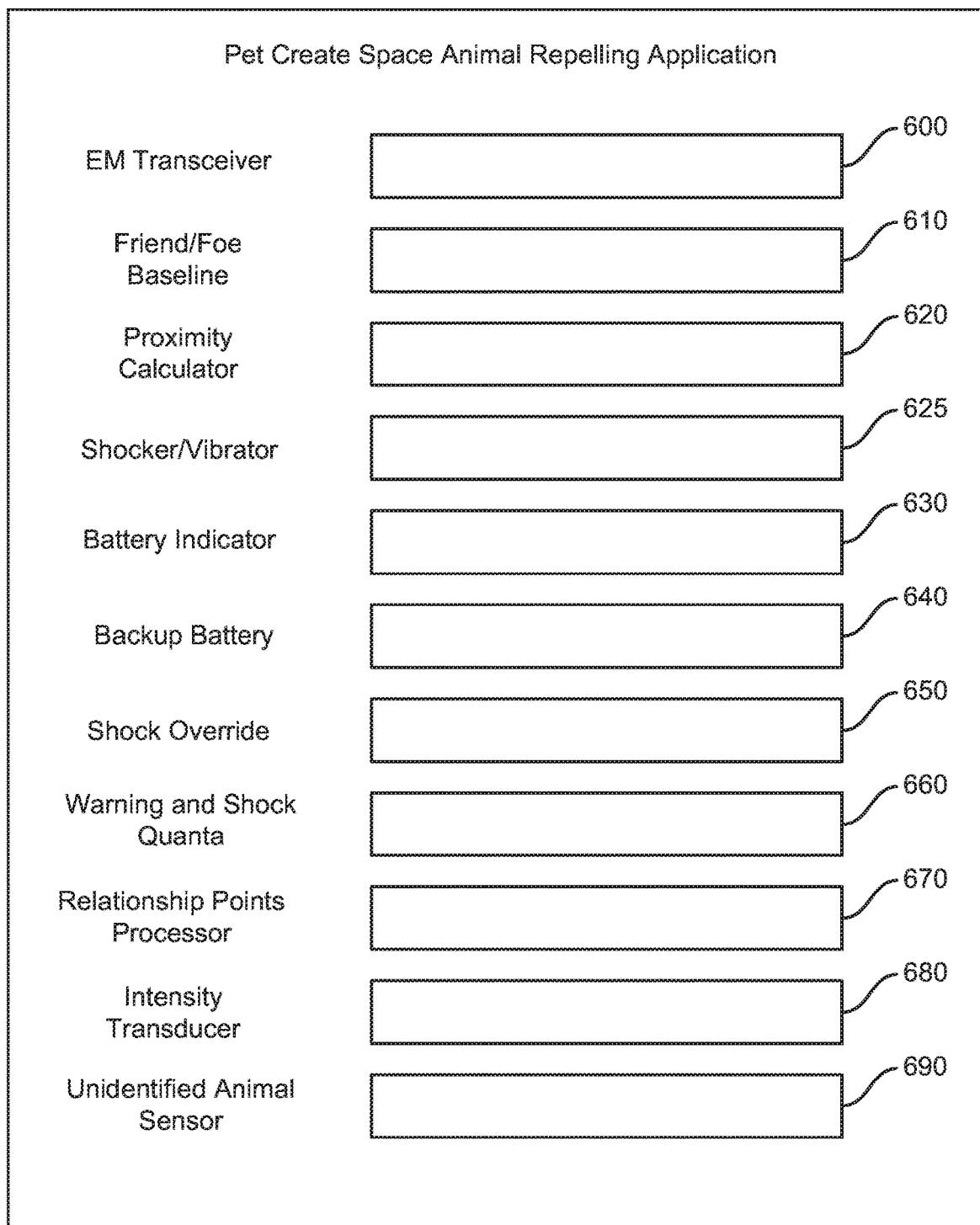
FIG. 6 is a pictorial diagram of a cell phone application for pet create animal repelling in accordance with an embodiment of the present disclosure.

FIG. 6 is a pictorial diagram of a cell phone application for pet create animal repelling in accordance with an embodiment of the present disclosure. The depiction includes components of a cell phone screen portion or of a computer screen portion indicating fields receiving input from a user of the application. The depiction includes adjustable fields for an EM transceiver 600, a friend/foe baseline 610, a proximity calculator 620, a shocker/vibrator 625, a battery indicator 630, a backup battery indicator 640, a shock override 650, a warning and shock quanta 660, a relationship points processor 670, an intensity transducer 680 and an unidentified animal sensor 690.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. A method for animal aversion training, comprising:
   a) outfitting at least two animals each with an EM (electromagnetic) transceiver, processor and power source;
   b) processing a proximity distance between the at least two animals via the EM transceiver, processor and power source;
   c) identifying a relationship quality of the at least two animals via an unfriendly threshold and a number of points tallied from past encounters; and
   d) delivering a pulse shock to the at least two animals of intensity based on the relationship quality and the proximity distance between them.

2. The method of claim 1, wherein the EM transceiver is a peer-to-peer active RFID (radio frequency identification) transceiver configured with a typical read range of less than or equal to 100 meters between beacon signals of predetermined time intervals.

3. The method of claim 1, wherein the EM transceiver is a GPS (Global Positioning System) transceiver configured with a typical read range of greater than or equal to 100 meters between beacon signals of predetermined time intervals.

4. The method of claim 1, further comprising predetermining a threshold proximity distance between the at least two animals wherein a proximity distance greater than the threshold results in a null delivered pulse shock.

5. The method of claim 1, wherein the pulse shock is a pulse vibration known to be unpleasant and deterring to an animal, especially a canine or a feline.

6. The method of claim 1, wherein the power source comprises a battery and a backup battery.

7. The method of claim 1, wherein processing a proximity distance comprises dividing a signal travel time between respective EM transceivers by a travel speed of a radio wave carrying the signal.

8. The method of claim 1, wherein processing a proximity distance comprises a GPS calculated distance between the two respective EM transceivers.

9. The method for playing the game of claim 1, further comprising tallying a number of points from past encounters of the at least two animals by adding a point for a past encounter that is longer than a predetermined period of time.

10. The method of claim 1, wherein identifying a relationship quality between the at least two animals further comprises setting a point threshold for an unfriendly relationship.

11. The method of claim 1, wherein delivering a warning pulse shock intensity to the at least two animals triggered by the processed proximity distance being less than a predetermined minimum proximity distance.

12. The method of claim 1, wherein the pulse shock intensity is determined by a magnitude of the points tallied from past encounters.

13. The method of claim 1, wherein the pulse shock intensity is preset to a quantized range according to a quantized proximity distance.

14. The method of claim 1, further comprising subtracting a point from the number of points tallied based on a predetermined time interval having no past encounter between the at least two animals.

15. The method of claim 1, further comprising overriding the pulse shock aversion training to one of the at least two animals.

16. A system for animal aversion training, comprising:
a) a module configured to initialize an EM (electromagnetic) transceiver, processor and power source for each of at least two animals;
b) a module configured to process a proximity distance between the at least two animals via the EM transceiver, processor and power source;
c) a module configured to identify a relationship quality of the at least two animals via an unfriendly threshold and a number of points tallied from past encounters; and
d) a module configured to deliver a pulse shock to the at least two animals of intensity based on the relationship quality and the proximity distance between them.

17. The system of claim 1, further comprising a collar for each of the at least two animals, the collar comprising the EM transceiver, the process and the power source.

18. The system of claim 1, further comprising a sensor for a first animal to detect a proximity distance of a second animal not having an EM transceiver, the sensor configured to replace a function of the EM transceiver for the second animal.

* * * * *